United States Patent
Huang et al.

(10) Patent No.: US 12,340,490 B2
(45) Date of Patent: Jun. 24, 2025

(54) IMAGE PROCESSING METHOD AND APPARATUS

(71) Applicant: VIVO MOBILE COMMUNICATION CO., LTD., Dongguan (CN)

(72) Inventors: Zhen Huang, Dongguan (CN); Qiao Li, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 377 days.

(21) Appl. No.: 17/987,987

(22) Filed: Nov. 16, 2022

(65) Prior Publication Data

US 2023/0076026 A1 Mar. 9, 2023

Related U.S. Application Data

(63) Continuation of application No. PCT/CN2021/093754, filed on May 14, 2021.

(30) Foreign Application Priority Data

May 21, 2020 (CN) .......................... 202010435861.8

(51) Int. Cl.
  *G06T 5/80* (2024.01)
  *G06N 3/045* (2023.01)
(52) U.S. Cl.
  CPC ............... *G06T 5/80* (2024.01); *G06N 3/045* (2023.01); *G06T 2207/20084* (2013.01)
(58) Field of Classification Search
  CPC ........ G06N 3/045; G06N 3/0475; G06N 3/08; G06T 2207/20081; G06T 2207/20084;

(Continued)

(56) References Cited

U.S. PATENT DOCUMENTS 11,030,738 B2 * 6/2021 Li ........................... G06T 7/001
11,587,323 B2 * 2/2023 Israel .................... G06V 40/172

(Continued)

FOREIGN PATENT DOCUMENTS

| CN | 109978807 A | * | 7/2019 | |
| CN | 110033423 A | * | 7/2019 | ............. G06T 5/50 |
| CN | 110443763 A | * | 11/2019 | ............. G06T 5/001 |

OTHER PUBLICATIONS

Xiaowei Hu et al., "Mask-ShadowGAN: Learning to Remove Shadows from Unpaired Data," Oct. 2019, Proceedings of the IEEE/CVF International Conference on Computer Vision (ICCV), 2019, pp. 2472-2479.*

(Continued)

*Primary Examiner* — Omar S Ismail
(74) *Attorney, Agent, or Firm* — Stites & Harbison, PLLC; Jeffrey A. Haeberlin

(57) ABSTRACT

An image processing method and apparatus belong to the technical field of communication. The method comprises: acquiring a target image including a shadow; and removing the shadow from the target image based on a target model, to acquire an image after shadow removal, wherein the target model is a model trained based on a target image sample including a shadow and a shadow image sample corresponding to the target image sample, the target image sample is a sample generated based on a captured shadow-free image sample and a preset emulated imaging condition, and the shadow image sample is a sample determined based on the target image sample and the shadow-free image sample.

15 Claims, 6 Drawing Sheets

(58) Field of Classification Search
CPC ... G06T 2207/30176; G06T 5/60; G06T 5/80; G06T 5/94; G06V 10/82; G06V 30/40; H04N 23/74
See application file for complete search history.

(56) References Cited

U.S. PATENT DOCUMENTS

| | | | | |
|---|---|---|---|---|
| 2019/0096135 | A1* | 3/2019 | Dal Mutto | G06F 18/24765 |
| 2019/0108396 | A1* | 4/2019 | Dal Mutto | G06V 20/52 |
| 2020/0074674 | A1* | 3/2020 | Guo | G06V 20/54 |
| 2020/0226757 | A1* | 7/2020 | Hare, II | G16H 40/63 |
| 2020/0342586 | A1* | 10/2020 | Kumar | G06T 7/136 |
| 2020/0372625 | A1* | 11/2020 | Dal Mutto | G06F 18/254 |

OTHER PUBLICATIONS

Xiaodong Cun et al., "Towards Ghost-Free Shadow Removal via Dual Hierarchical Aggregation Network and Shadow Matting GAN," The Thirty-Fourth AAAI Conference on Artificial Intelligence (AAAI-20), pp. 10680-10686.*

Anna Kreshuk et al., "Automated Detection of Synapses in Serial Section Transmission Electron Microscopy Image Stacks," Feb. 6, 2014, PLOS ONE, Feb. 2014, vol. 9, Issue 2,e87351, pp. 1-7.*

Hee-Jin Yoon et al., "Shadow Detection and Removal From Photo-Realistic Synthetic Urban Image Using Deep Learning," 2020, Computers, Materials & Continua CMC, vol. 62, No. 1, pp. 459-470.*

Xiaofeng Ma et al., "A deep learning model for incorporating temporal information in haze removal," Mar. 29, 2022, Remote Sensing of Environment 274 (2022) 113012, pp. 1-10.*

Giorgio Morales et al., "Shadow Removal in High-Resolution Satellite Images Using Conditional Generative Adversarial Networks," Feb. 8, 2019, pp. 328-336.*

Jifeng Wang et al., "Stacked Conditional Generative Adversarial Networks for Jointly Learning Shadow Detection and Shadow Removal," Jun. 2018, Proceedings of the IEEE Conference on Computer Vision and Pattern Recognition (CVPR), 2018,Springer Nature Switzerland AG 2019,J. A. Lossio-Ventura et al. (Eds.): SIMBig 2018.*

Vu Nguyen et al., "Shadow Detection with Conditional Generative Adversarial Networks," Oct. 2017, Proceedings of the IEEE International Conference on Computer Vision (ICCV), 2017, pp. 4510-4517.*

European Patent Office, Extended European Search Report issued in corresponding Application No. EP 21808679 dated Nov. 3, 2023.

Morales, G., et al. Shadow Removal in High-Resolution Satellite Images Using Conditional Generative Adversarial Networks. 5th International Conference, SIMBig 2018, Lima, Peru, vol. 989, pp. 328-340, dated Sep. 3, 2018. See: EESR.

Hu, X, et al. Mask-ShadowGAN: Learning to Remove Shadows from Unpaired Data. 2019 IEEE/CVF International Conference on Computer Vision (ICCV), pp. 2472-2481, dated Oct. 27, 2019. See: EESR.

Yoon, H-J, et al. Shadow Detection and Removal From Photo-Realistic Synthetic Urban Image Using Deep Learning. Computers, Materials & Continua, vol. 62, No. 1, pp. 459-472, 2020. See: EESR.

Wang, J., et al. "Stacked Conditional Generative Adversarial Networks for Jointly Learning Shadow Detection and Shadow Removal," 2018 IEEE/CVF Conference on Computer Vision and Pattern Recognition, Dec. 17, 2018. See: ISR.

Wang, J. "Deep Learning Methods for Shadow Removal and Haze Removal," Nanjing University of Science & Technology, Information Science & Technology, China Master's Theses Full-text Database, Jun. 15, 2020. See: ISR.

China National Intellectual Property Administration, International Search Report issued in corresponding Application No. PCT/CN2021/093754 mailed Jul. 26, 2021.

\* cited by examiner

IMAGE PROCESSING METHOD AND APPARATUS

CROSS-REFERENCE TO RELATED APPLICATIONS

This application is a continuation of International Application No. PCT/CN2021/093754, filed on May 14, 2021, which claims priority to Chinese Patent Application No. 202010435861.8 filed in China on May 21, 2020, which is incorporated herein by reference in its entirety.

TECHNICAL FIELD

This application belongs to the technical field of communication, and specifically relates to an image processing method and apparatus.

BACKGROUND

When users use camera devices to take photos, captured images often include shadows of obstructions such as persons and scenes due to the limitations of illumination, shooting angles, and other factors. For example, when a user shoots a document, the block of the camera often causes a shadow in a finally captured image.

In a process of implementing this application, the applicant finds that there are at least the following problems in the related technology: if an obstruction causes a shadow in a captured image, the imaging effect is unclear, which affects user shooting experience. Therefore, in order to improve the user shooting experience, an image processing method is urgently needed to remove the shadow in the image.

SUMMARY

According to a first aspect of this application, an image processing method is provided, which includes:
 acquiring a target image including a shadow; and
 removing the shadow from the target image based on a target model, to acquire an image after shadow removal, wherein the target model is a model trained based on a target image sample including a shadow and a shadow image sample corresponding to the target image sample, the target image sample is a sample generated based on a captured shadow-free image sample and a preset emulated imaging condition, and the shadow image sample is a sample determined based on the target image sample and the shadow-free image sample.

According to a second aspect of this application, an image processing apparatus is provided, which includes:
 a target image acquisition module configured to acquire a target image including a shadow; and
 a shadow removal module configured to remove the shadow from the target image based on a target model, to acquire an image after shadow removal, wherein the target model is a model trained based on a target image sample including a shadow and a shadow image sample corresponding to the target image sample, the target image sample is a sample generated based on a captured shadow-free image sample and a preset emulated imaging condition, and the shadow image sample is a sample determined based on the target image sample and the shadow-free image sample.

According to a third aspect of this application, an electronic device is provided, which includes a processor, a memory, and programs or instructions stored in the memory and executable on the processor, where the programs or the instructions, when executed by the processor, implement the steps of the method according to the first aspect.

According to a fourth aspect of this application, a computer-readable storage medium storing programs or instructions is provided, where the programs or the instructions, when executed by the processor, implement the steps of the method according to the first aspect.

According to a fifth aspect of this application, a chip is provided, which includes a processor and a communications interface, where the communications interface is coupled with the processor, and the processor is configured to execute programs or instructions to implement the steps of the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments acquired by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way is interchangeable in appropriate circumstances so that the embodiments of this application described can be implemented in other orders than the order illustrated or described herein. In addition, "and/or" in the specification and claims represents at least one of connected objects. Symbol "/" in this specification generally represents an "or" relationship between associated objects.

The image processing method and apparatus provided in the embodiments of this application are described in detail below through specific embodiments and application scenarios thereof with reference to the accompanying drawings.

In some application scenarios, when a user takes a photo of a document with a camera component of an electronic device, a captured document image is often blocked by an obstruction such as the electronic device. As a result, in the finally acquired document image, only a part of the image is bright and a part of the image is dark, and this part is dark because the obstruction blocks light and a shadow is generated. However, in some scenarios, the shadow in the image affects the imaging effect.

Based on this, the embodiments of this application provide an image processing method and apparatus, which can remove shadows in images. The following detailed description will be made with reference to specific examples and drawings.

Figure 1:
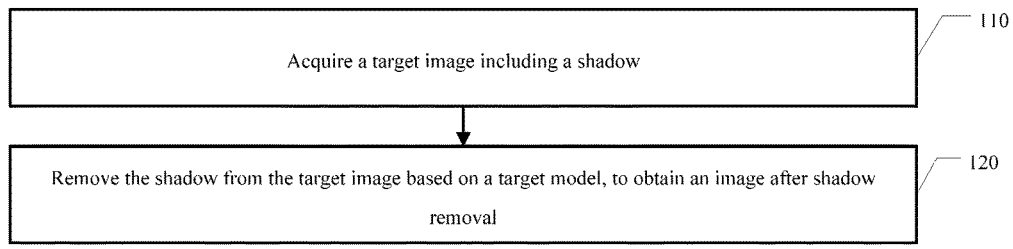
FIG. 1 is a flowchart of an image processing method provided by an embodiment of this application.

FIG. 1 is a flowchart of an image processing method provided by an embodiment of this application. The image processing method may be performed by an image processing apparatus. As shown in FIG. 1, this image processing method includes step 110 and step 120.

Step 110: Acquire a target image including a shadow.

Step 120: Remove the shadow from the target image based on a target model, to acquire an image after shadow removal.

The target model is a model trained based on a target image sample including shadows and a shadow image sample corresponding to the target image sample.

The target image sample is a sample generated based on a captured shadow-free image sample and a preset emulated imaging condition, and the shadow image sample is a sample determined based on the target image sample and the shadow-free image sample.

In the embodiments of this application, various real environments in reality can be emulated based on the preset emulated imaging condition, while the actually captured shadow-free image sample is real image data. Therefore, the target image sample is generated based on the actually captured shadow-free image sample and the preset emulated imaging condition, so that the real data and the emulated imaging condition can be combined, to quickly acquire the highly real target image sample and the shadow image sample corresponding to the target image sample that are used to train the target model for removing image shadows, thereby improving the training accuracy and speed of the target model. Since the trained target model is trained based on the target image sample including a shadow and the shadow image sample corresponding to the target image sample, the shadow in the target image can be removed based on the trained target model. Because the training speed and accuracy of the target model are improved, the shadow in the target image can be quickly and accurately removed.

Figure 2:
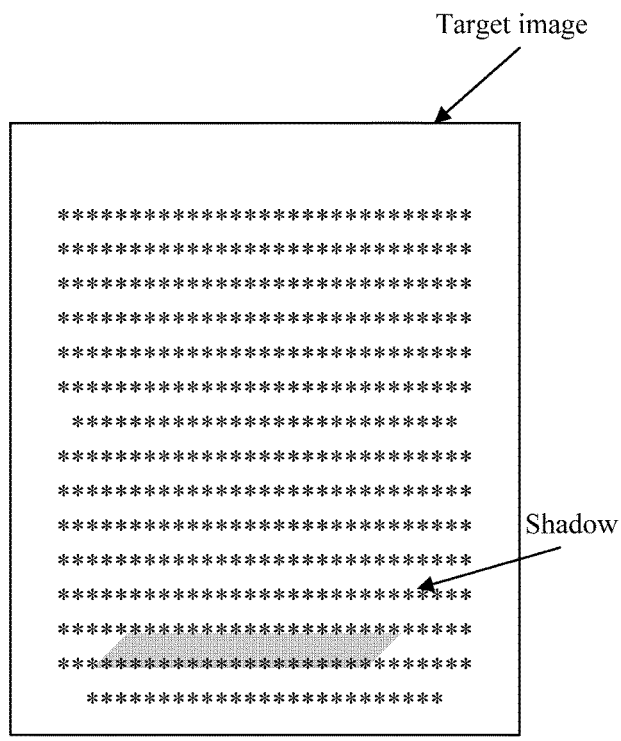
FIG. 2 is a schematic diagram of a target image including a shadow provided by an embodiment of this application.

In step 110, the target image may be a real image including a shadow shot by the user. FIG. 2 is a schematic diagram of a target image including a shadow provided by an embodiment of this application. As shown in FIG. 2, the target image is an image of a document including shadows.

The specific implementation of step 120 is described below.

In the embodiments of the application, in training to generate the target model, a large number of training samples are needed, and the training samples include data such as images with shadows and images without shadows. These training samples are expensive to acquire in real life.

Therefore, to reduce the acquisition costs of training samples and improve the acquisition efficiency of training samples to improve the training efficiency of target models, a target image sample may be generated based on the captured shadow-free real image sample and the preset emulated imaging condition.

For example, the 3D rendering engine can be used to build a required emulated imaging scenario, that is, emulate the actual environmental state, and then a large number of training samples can be acquired by snapshot or screen capture.

Figure 3:
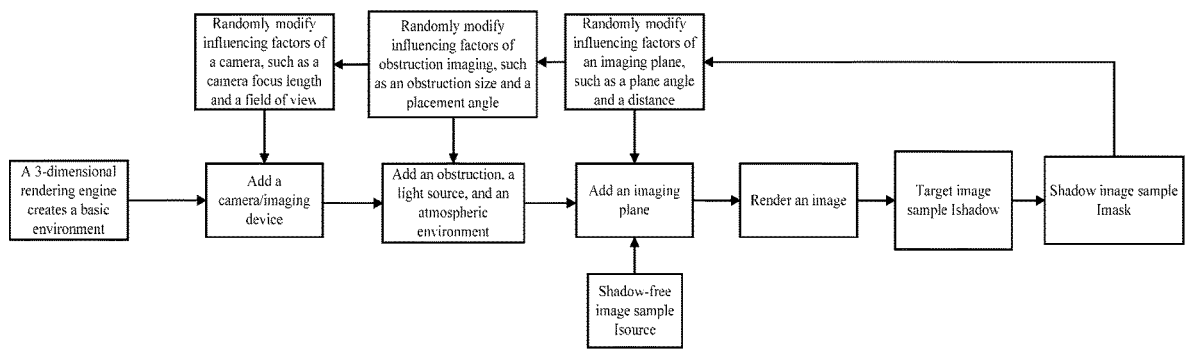
FIG. 3 is a schematic flowchart of constructing a target image sample provided by an embodiment of this application.
Figure 4:
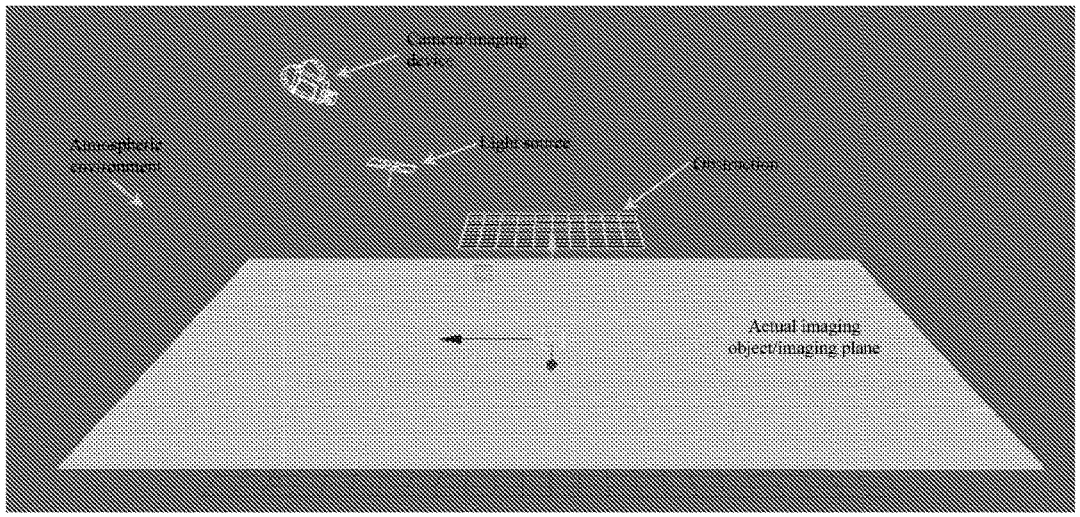
FIG. 4 is a schematic diagram of constructing a target image sample and a shadow image sample in a three-dimensional rendering engine provided by an embodiment of this application.

For example, the 3D rendering engine can be Maya modeling software, which is a 3D modeling and animation software. The 3D rendering engine can emulate a real imaging scenario. FIG. 3 is a schematic flowchart of constructing a target image sample provided by an embodiment of this application. FIG. 4 is a schematic diagram of constructing a target image sample and a shadow image sample in a three-dimensional rendering engine provided by this application. As shown in FIG. 3, a basic environment is first created in the 3D rendering engine, and then the emulated imaging condition such as a camera/imaging device, a preset obstruction, a light source, an atmospheric environment, and an imaging plane are added to the basic environment. It should be noted that the order of adding different emulated imaging conditions is not limited, and FIG. 3 is only an example. FIG. 4 shows the preset emulated imaging conditions added in FIG. 3, including a preset camera/imaging device, a preset emulated light source, a preset obstruction, an actual imaging object/imaging plane and a preset atmospheric environment.

The preset emulation imaging conditions are adjusted according to actually needed data conditions, and are arranged regularly. To improve the authenticity of the training samples, as shown in FIG. 3, the captured shadow-free real image samples are added to the emulated imaging scenario created in FIG. 4. The captured shadow-free real image sample (marked as Isource) is added to the actual imaging object/imaging plane, that is, the actual imaging plane is filled with the captured shadow-free real image sample. When the renderer is started in Maya modeling software to render the emulated imaging scenario created, the target image sample (marked as Ishadow) generated by superimposing a shadow on the captured shadow-free real image sample is output. Then, the shadow image sample (marked as Imask) can be acquired by removing the captured shadow-free real image sample from the target image sample.

To generate a large number of different training sample data, influencing factors of the shooting camera, such as a camera focal length and a shooting field of vision can be randomly modified, and the imaging degree of the obstruction, such as an obstruction size and an obstruction placement angle can also be randomly modified, or influencing factors of the imaging plane, such as the angle of the imaging plane or the distance between the imaging plane and different objects such as a light source, a shooting camera, or an obstruction can also be randomly modified.

By adjusting the emulated imaging conditions and/or changing the captured shadow-free real image samples, different training sample data can be acquired. Emulated imaging conditions that may be adjusted can also include parameters such as the type of a light source, illumination intensity, and atmospheric environment parameters, which are not listed herein.

In some embodiments, the target model can be a convolution neural network model, a recurrent neural network model, and other different models that are used to perform shadow removal in the image. By inputting the target image into the target model, the image after shadow removal can be directly acquired.

In some other embodiments, the illumination parameters in the target image can be determined by using the trained target model. Then, the target image is processed by using the illumination parameters, and the shadow in the target image can be removed.

In some other embodiments, the shadow image in the target image can be acquired by using the trained target model, and then the shadow image can be removed from the target image, so that the image after shadow removal can be acquired.

In some embodiments of this application, in order to improve the accuracy of shadow removal, the trained target model can be a trained generative adversarial network. To facilitate description of the specific implementation of removing the shadow from the target image by using the trained generative adversarial network, the specific implementation of training a generative adversarial network will be introduced below.

Figure 5:
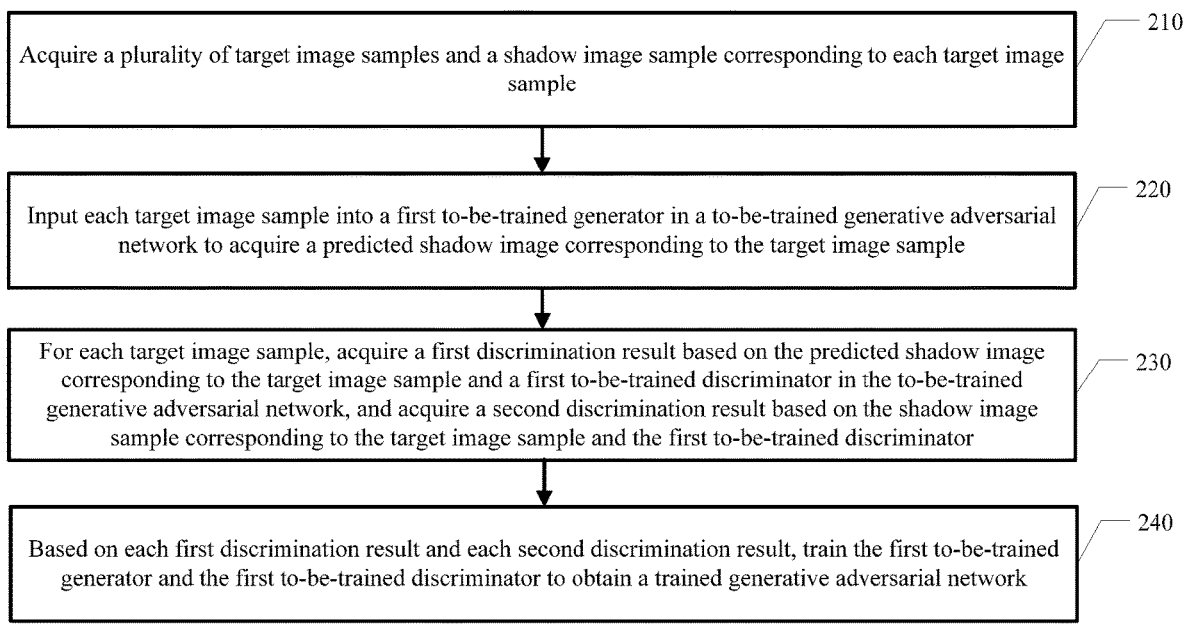
FIG. 5 is a schematic flowchart of training a generative adversarial network provided by an embodiment of this application.

FIG. 5 is a schematic flowchart of training a generative adversarial network provided by an embodiment of this application. As shown in FIG. 5, training a generative adversarial network includes steps 210 to 240.

Step 210: Acquire a plurality of target image samples and a shadow image sample corresponding to each target image sample.

Step 220: Input each target image sample into a first to-be-trained generator in a to-be-trained generative adversarial network to acquire a predicted shadow image corresponding to the target image sample.

Step 230: For each target image sample, acquire a first discrimination result based on the predicted shadow image corresponding to the target image sample and a first to-be-trained discriminator in the to-be-trained generative adversarial network, and acquire a second discrimination result based on the shadow image sample corresponding to the target image sample and the first to-be-trained discriminator.

Step 240: Based on each first discrimination result and each second discrimination result, train the first to-be-trained generator and the first to-be-trained discriminator to acquire a trained generative adversarial network.

The target image sample is a sample generated based on a captured shadow-free real image sample and a preset emulated imaging condition. The shadow image sample is a sample determined based on the target image sample and the shadow-free image sample.

In the embodiments of this application, various real environments in reality can be emulated based on the preset emulated imaging condition, while the actually captured shadow-free image sample is real image data. Therefore, the target image sample is generated based on the actually captured shadow-free image sample and the preset emulated imaging condition, so that the real data and the emulated imaging condition can be combined, to quickly acquire the highly real target image sample and the shadow image sample corresponding to the target image sample that are used to train the generative adversarial network, thereby improving the training accuracy and speed of the generative adversarial network.

The specific implementation of each step in steps 210 to 240 will be described in detail below.

In the embodiments of this application, the generative adversarial network mainly includes two parts: a generator and a discriminator. The generator can independently output a required image, text, or video data by the network through an input, that is, is configured to generate data. The discriminator is configured to discriminate data generated by the generator and determine whether the data generated by the generator is close to the truth.

The specific implementation of step 220 is described below.

In a process of training a to-be-trained generative adversarial network, a batch of training samples can be used and include a plurality of target image samples and a shadow image sample corresponding to each target image sample.

Figure 6:
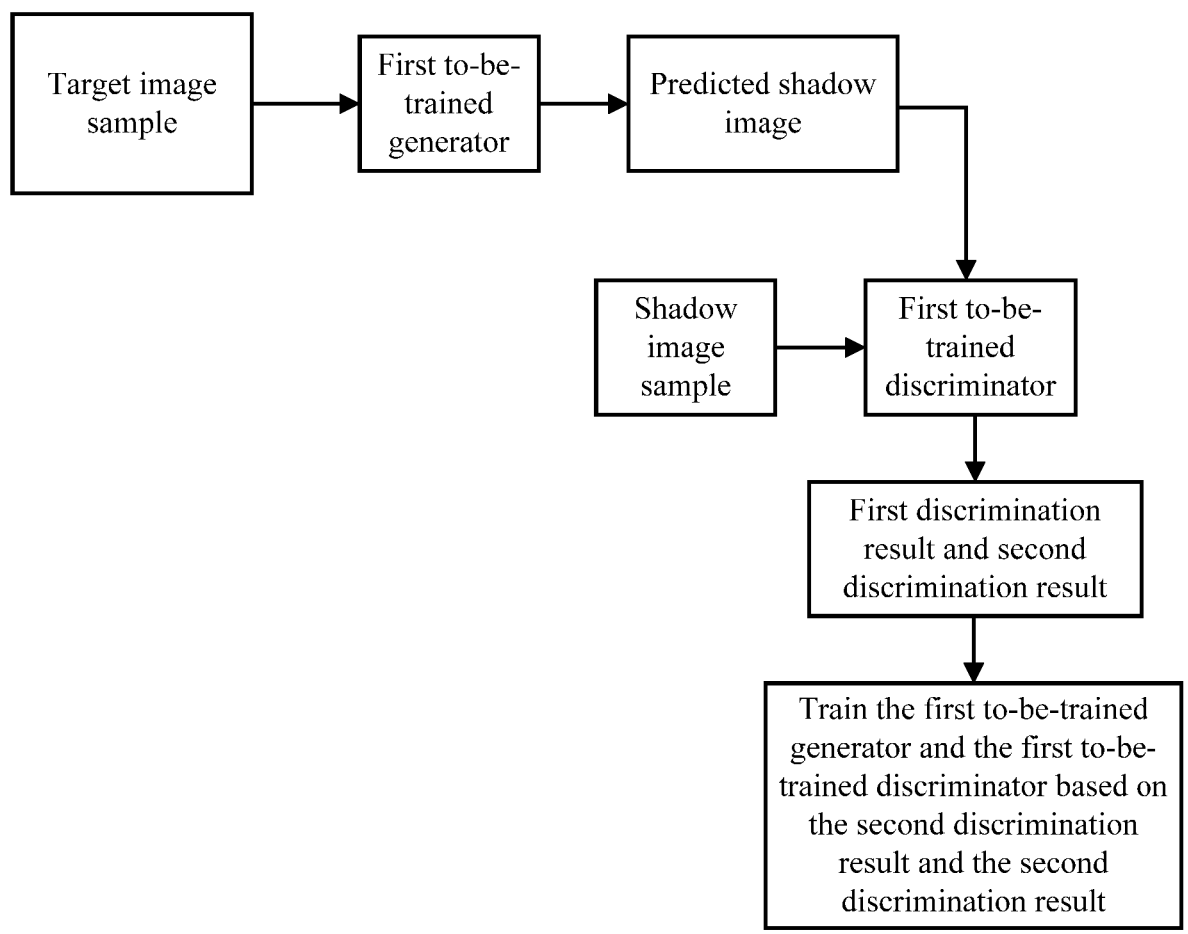
FIG. 6 is another schematic flowchart of training a generative adversarial network provided by an embodiment of this application.

For example, FIG. 6 is another schematic flowchart of training a generative adversarial network provided by an embodiment of this application. Each target image sample is input into a first to-be-trained generator in a to-be-trained generative adversarial network to acquire a predicted shadow image corresponding to the target image sample. The predicted shadow image corresponding to the target image sample is the image generated by the first to-be-trained generator.

The specific implementation of step 230 is described below.

In some embodiments, in order to improve the training speed, step 230 includes: for each target image sample, acquiring the first discrimination result by inputting the predicted shadow image corresponding to the target image sample into the first to-be-trained discriminator in the to-be-trained generative adversarial network, and acquiring the second discrimination result by inputting the shadow image sample corresponding to the target image sample into the first to-be-trained discriminator.

That is, the first to-be-trained discriminator directly discriminates the image output by the first to-be-trained generator. The predicted shadow image is input into the first to-be-trained discriminator in the to-be-trained generative adversarial network to acquire the first discrimination result, and the shadow image sample is input into the first to-be-trained discriminator in the to-be-trained generative adversarial network to acquire the second discrimination result.

For example, the first discrimination result includes a probability that the predicted shadow image is a true image and a probability that the predicted shadow image is a false image. The second discrimination result includes a probability that the shadow image sample is a true image and a probability that the shadow image sample is a false image.

In some other embodiments, to increase the discrimination accuracy of the first to-be-trained discriminator, the discriminator needs to acquire more feature information. Therefore, step 230 may include: for each target image sample, performing channel fusion on the target image sample and the predicted shadow image corresponding to the target image sample to acquire a first fused image, and performing channel fusion on the target image sample and the shadow image sample corresponding to the target image sample to acquire a second fused image; and for each first fused image and each second fused image, inputting the first fused image and the second fused image into the first to-be-trained discriminator to acquire a first discrimination result and a second discrimination result.

The first discrimination result includes a probability that the first fused image is a true image and a probability that the first fused image is a false image. The second discrimination result includes a probability that the second fused image is a true image and a probability that the second fused image is a false image.

Figure 7:
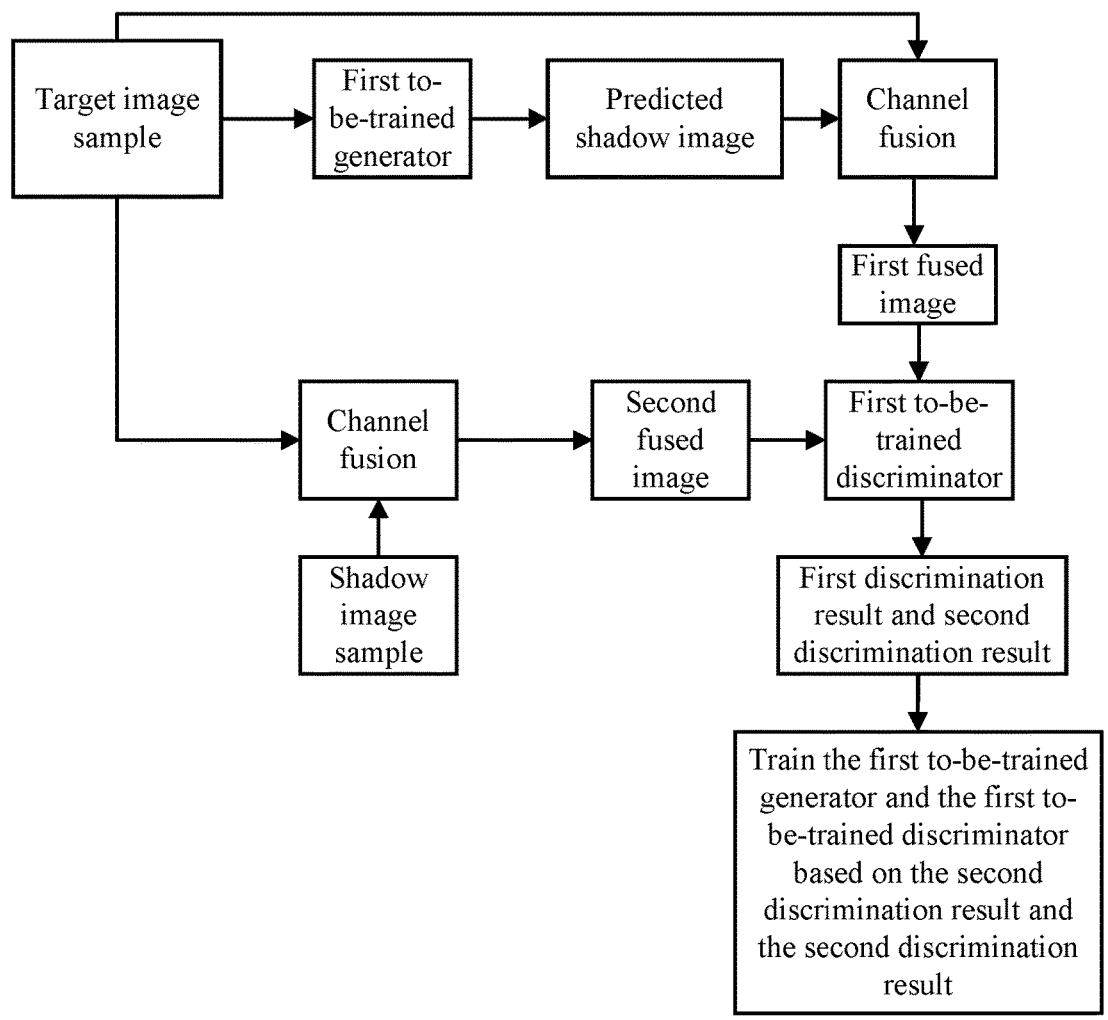
FIG. 7 is still another schematic flowchart of training a generative adversarial network provided by an embodiment of this application.

FIG. 7 is still another schematic flowchart of training a generative adversarial network provided by an embodiment of this application. The difference between the process of training a generative adversarial network shown in FIG. 7 and the process of training a generative adversarial network shown in FIG. 6 is that in FIG. 7, the first fused image is acquired by performing channel fusing on the target image sample and the predicted shadow image corresponding to the target image sample, and then the first fused image is input into the first to-be-trained discriminator to acquire the first discrimination result, and the second fused image is acquired by performing channel fusing on the target image sample and the shadow image sample corresponding to the target image sample, and then the second fused image is input into the first to-be-trained discriminator to acquire the second discrimination result. That is, the input of the first to-be-trained discriminator is the first fused image and the second fused image.

In the embodiments of the application, the first fused image acquired by performing channel fusing on the target image sample and the predicted shadow image corresponding to the target image sample is input into the first to-be-trained discriminator, so that the first to-be-trained discriminator can acquire more image feature information, and the discrimination accuracy of the first to-be-trained discriminator can be improved. Similarly, the second fused image acquired by performing channel fusing on the target image sample and the shadow image sample corresponding to the target image sample is input into the first to-be-trained discriminator, so that the first to-be-trained discriminator can acquire more image feature information, and the discrimination accuracy of the first to-be-trained discriminator can be improved.

For example, channel fusion of two images may be: sequentially splicing channels of two images with the same length and width to generate a deeper image. In another example, channel fusion of two images may also include: adding or subtracting channels corresponding to the two images, or the like.

The specific implementation of step 240 is described below.

In some embodiments, the first to-be-trained generative adversarial network includes a first to-be-trained generator and a first to-be-trained discriminator. As shown in FIG. 6 and FIG. 7, based on each first discrimination result and each second discrimination result, the first to-be-trained generator and the first to-be-trained discriminator may be trained to acquire a trained generative adversarial network.

It should be noted that in some embodiments, in the process of training the first to-be-trained generator and the first to-be-trained discriminator, the first to-be-trained generator and the first to-be-trained discriminator can be alternately trained. That is, when training the first to-be-trained generator, parameters of the first to-be-trained discriminator can be kept unchanged and parameters of the first to-be-trained generator are adjusted. When training the first to-be-trained discriminator, parameters of the first to-be-trained generator can be kept unchanged and parameters of the first to-be-trained discriminator are adjusted.

A specific implementation of training the first to-be-trained discriminator is introduced first below.

For example, a label of the predicted shadow image corresponding to each target image sample is set to 0, which means that the first to-be-trained discriminator hopes that images output by the first to-be-trained generator are all false images. A label of the shadow image sample corresponding to the target image sample is set to 1.

Based on the first discrimination result corresponding to each predicted shadow image, the label 0 of each predicted shadow image, and a preset loss function, a loss function value $LOSS_1$ can be calculated. Based on the second discrimination result corresponding to each shadow image sample, the label 1 of the shadow image sample, and the preset loss function, a loss function value $LOSS_2$ can be calculated.

Then, the loss function value $LOSS_1$ and the loss function value $LOSS_2$ are added to acquire a loss function value $LOSS_{D1}$. Then, based on the loss function value $LOSS_{D1}$ and a back propagation method, each parameter in the first to-be-trained discriminator is adjusted.

It should be noted that in the process of adjusting each parameter of the first to-be-trained discriminator, each parameter of the first to-be-trained generator does not change.

Next, the specific implementation of training the first to-be-trained generator is introduced.

For example, a label of the predicted shadow image corresponding to each target image sample is set to 1, which means that the first to-be-trained generator hopes that images output by the first to-be-trained generator are all true images.

Based on the first discrimination result corresponding to each predicted shadow image, the label 1 of each predicted shadow image, and a preset loss function, a loss function value $LOSS_{G1}$ can be calculated. Then, based on the loss function value $LOSS_{G1}$ and a back propagation method, each parameter in the first to-be-trained generator is adjusted. When training the first to-be-trained generator, parameters of the first to-be-trained discriminator can be kept unchanged and parameters of the first to-be-trained generator are adjusted.

It should be noted that in the process of training the first to-be-trained generator and the first to-be-trained discriminator, it can be determined whether the first to-be-trained generator or the first to-be-trained discriminator should be emphasized according to the relative value relationship between $LOSS_{D1}$ and $LOSS_{G1}$. For example, at the initial training stage, the first to-be-trained generator and the first to-be-trained discriminator are alternately trained once. If it is found that the $LOSS_{D1}$ is larger and the $LOSS_{G1}$ is smaller in the training process, it means that the performance of the first to-be-trained generator is better. Then, the first to-be-trained discriminator may be trained 10 times, and then the first to-be-trained generator may be trained once.

In some other embodiments, the back propagation algorithm can also be used to train the first to-be-trained generator and the first to-be-trained discriminator at the same time. The process of training the first to-be-trained generator and the first to-be-trained discriminator by using the back propagation algorithm at the same time is described herein in detail. For details, refer to the above-mentioned process of training the first to-be-trained generator and the first to-be-trained discriminator by using the back propagation algorithm.

In some embodiments of this application, the training of the first to-be-trained generator and the first to-be-trained discriminator can be stopped according to a first preset training stop condition.

For example, the first preset training stop condition includes that both $LOSS_{D1}$ and $LOSS_{G1}$ are less than a first preset threshold.

For another example, the first preset training stop condition includes that a total number of training times of the first to-be-trained generator and the first to-be-trained discriminator reaches a preset training times threshold.

It should be noted that when training the first to-be-trained generator and the first to-be-trained discriminator, different batches of training samples are used in each training process. For a batch of training samples, the accuracy of the first to-be-trained discriminator can be counted according to each first discrimination result and each second discrimination result. If the number of training times is N, each training corresponds to an accuracy rate of a first to-be-trained discriminator. The preset training stop condition also includes that the average of N accuracy rates is greater than a preset accuracy rate threshold. N is a positive integer.

In some other embodiments, when the input of the first discriminator is the first fused image and the second fused image, the $LOSS_{D1}$ and the $LOSS_{G1}$ can be calculated according to the label and each first discriminant result corresponding to each first fused image and the label and each second discriminant result corresponding to each second fused image, so as to train a to-be-trained generative adversarial network. A specific training process is similar to the above training process in the scenario in which the predicted shadow image and the shadow image sample are respectively input to the first to-be-trained discriminator, and will not be repeated herein.

In some embodiments of this application, if the pre-trained generative adversarial network only includes the first trained generator and the first trained discriminator, only the shadow image can be acquired by using the generative adversarial network. To remove the shadow from the target image with the shadow, the shadow image can be directly removed from the target image, and the image after shadow removal can be acquired.

However, in some other embodiments, in order to improve the accuracy of shadow removal in the target image, a deep learning method can be used to acquire the image after shadow removal. That is, the pre-trained generative adversarial network also includes a second generator and a second discriminator, so that the image after shadow removal can be directly acquired by the second generator.

If the pre-trained generative adversarial network also includes a second generator and a second discriminator, the to-be-trained generative adversarial network also includes a second to-be-trained generator and a second to-be-trained discriminator. In this scenario, step 240 includes steps 2401 to 2403. Step 2401: For each first fused image, input the first fused image to a second to-be-trained generator to acquire a predicted shadow-free image. Step 2402: For each target image sample, acquire a third discrimination result based on the predicted shadow-free image corresponding to the target image sample and the second to-be-trained discriminator, and acquire a fourth discrimination result based on the shadow-free image sample corresponding to the target image sample and the second to-be-trained discriminator. Step 2403: Train the first to-be-trained generator and the first to-be-trained discriminator based on each first discrimination result and each second discrimination result, and train the second to-be-trained generator and the second to-be-trained discriminator based on each third discrimination result and each fourth discrimination result, to acquire a trained generative adversarial network.

Figure 8:
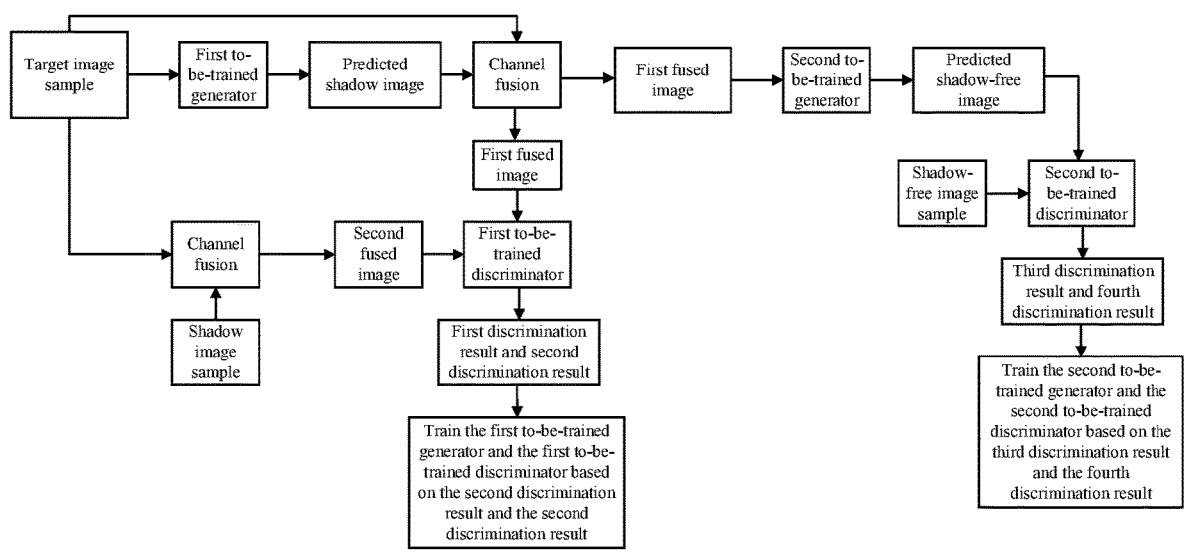
FIG. 8 is still another schematic flowchart of training a generative adversarial network provided by an embodiment of this application.

FIG. 8 is still another schematic flowchart of training a generative adversarial network provided by an embodiment of this application. The difference between the process of training a generative adversarial network shown in FIG. 8 and the process of training a generative adversarial network shown in FIG. 7 is that in some embodiments, for each first fused image, the first fused image is input into the second to-be-trained generator to acquire a predicted shadow-free image, for each predicted shadow-free image, the predicted shadow-free image is input into the second to-be-trained discriminator, to acquire a third discrimination result; and for each shadow-free image sample, the shadow-free image sample is input to the second to-be-trained discriminator, to acquire the fourth discrimination result. Then, the second to-be-trained generator and the second to-be-trained discriminator can be trained based on the third discrimination result and the fourth discrimination result.

It should be noted that, in the embodiments of this application, the process of training the second to-be-trained generator and the second to-be-trained discriminator is similar to the above process of training the first to-be-trained generator and the first to-be-trained discriminator.

In some embodiments, the second to-be-trained generator and the second to-be-trained discriminator can be trained alternately. A specific implementation of training the second to-be-trained discriminator is introduced first below.

For example, a label of each predicted shadow-free image is set to 0, which means that the second to-be-trained discriminator hopes that images output by the second to-be-trained generator are all false images.

Based on the third discrimination result corresponding to each predicted shadow-free image, the label 0 of each predicted shadow-free image, and a preset loss function, a loss function value $LOSS_3$ can be calculated. Based on the fourth discrimination result corresponding to each shadow-free image sample, the label 1 of the shadow-free image sample, and the preset loss function, a loss function value $LOSS_4$ can be calculated.

Then, the loss function value $LOSS_3$ and the loss function value $LOSS_4$ are added to acquire a loss function value $LOSS_{D2}$. Then, based on the loss function value $LOSS_{D2}$ and a back propagation method, each parameter in the second to-be-trained discriminator is adjusted.

It should be noted that in the process of adjusting each parameter of the second to-be-trained discriminator, each parameter of the second to-be-trained generator does not change.

Next, the specific implementation of training the second to-be-trained generator is introduced.

For example, a label of each predicted shadow-free image is set to 1, which means that the second to-be-trained generator hopes that images output by the second to-be-trained generator are all true images. Based on the third discrimination result corresponding to each predicted shadow-free image, the label 1 of each predicted shadow-free image, and a preset loss function, a loss function value $LOSS_{G2}$ can be calculated. Then, based on the loss function value $LOSS_{G2}$ and a back propagation method, each parameter in the second to-be-trained generator is adjusted. It should be noted that in the process of adjusting each parameter of the second to-be-trained generator, each parameter of the second to-be-trained discriminator does not change.

It should be noted that in the process of training the second to-be-trained generator and the second to-be-trained discriminator, it can be determined whether the second to-be-trained generator or the second to-be-trained discriminator should be emphasized according to the relative value relationship between $LOSS_{D2}$ and $LOSS_{G2}$.

In some other embodiments, the back propagation algorithm can also be used to train the second to-be-trained generator and the second to-be-trained discriminator at the same time. The process of training the second to-be-trained generator and the second to-be-trained discriminator by using the back propagation algorithm at the same time is described herein in detail. For details, refer to the above-mentioned process of training the second to-be-trained generator and the second to-be-trained discriminator by using the back propagation algorithm.

In some embodiments of this application, the training of the second to-be-trained generator and the second to-be-trained discriminator can be stopped according to a second preset training stop condition.

For example, the second preset training stop condition includes that both $LOSS_{D2}$ and $LOSS_{G2}$ are less than a second preset threshold.

For another example, the second preset training stop condition includes that a number of training times of the second to-be-trained generator and the second to-be-trained discriminator reaches a preset training times threshold.

It should be noted that when training the second to-be-trained generator and the second to-be-trained discriminator, different batches of training samples are used in each training process. For a batch of training samples, the accuracy of the second to-be-trained discriminator can be counted according to each third discrimination result and each fourth discrimination result. If the number of training times is M, each time of training corresponds to an accuracy rate of a second to-be-trained discriminator. The second preset training stop condition also includes that the average of M accuracy rates is greater than a preset accuracy rate threshold. M is a positive integer.

In some other embodiments of this application, to increase the discrimination accuracy of the second to-be-trained discriminator, step 2403 includes: for each target image sample, performing channel fusion on the predicted shadow-free image corresponding to the target image sample and the first fused image corresponding to the target image sample, to acquire a third fused image, and performing channel fusion on the shadow-free image sample corresponding to the target image sample and the second fused image corresponding to the target image sample, to acquire a fourth fused image; and for each third fused image and each fourth fused image, inputting the third fused image and the fourth fused image to a second to-be-trained discriminator to acquire a third discrimination result and a fourth discrimination result.

Figure 9:
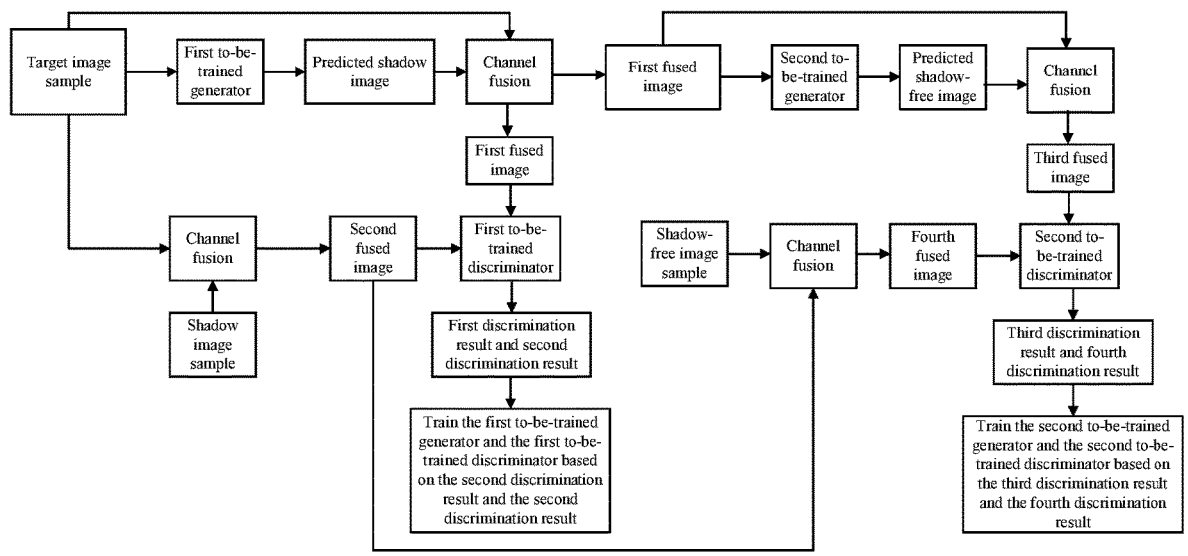
FIG. 9 is still another schematic flowchart of training a generative adversarial network provided by an embodiment of this application.

FIG. 9 is still another schematic flowchart of training a generative adversarial network provided by an embodiment of this application. The difference between the process of training a generative adversarial network shown in FIG. 9 and the process of training a generative adversarial network shown in FIG. 8 is that in FIG. 9, the third fused image is acquired by performing channel fusing on the first fused image and the predicted shadow-free image, and then the third fused image is input into the second to-be-trained discriminator to acquire the third discrimination result, and the fourth fused image is acquired by performing channel fusing on the second fused image and the shadow-free image sample, and then the fourth fused image is input into the second to-be-trained discriminator to acquire the fourth discrimination result. That is, the input of the second to-be-trained discriminator is the third fused image and the fourth fused image. Finally, the second to-be-trained generator and the second to-be-trained discriminator are trained based on the third discrimination result and the fourth discrimination result.

In some embodiments of this application, when the input of the second discriminator is the third fused image and the fourth fused image, the $LOSS_{D2}$ and the $LOSS_{G2}$ can be calculated according to the label and each third discriminant result corresponding to each third fused image and the label and each fourth discriminant result corresponding to each fourth fused image, so as to train a to-be-trained generative adversarial network. A specific training process is similar to the above training process in the scenario in which the predicted shadow-free image and the shadow-free image sample are respectively input to the second to-be-trained discriminator, and will not be repeated herein.

It should be noted that in the process of training the generative adversarial network, both the generator and the discriminator need to be trained. However, in the scenario in which the shadow in the target image is removed by using the pre-trained generative adversarial network, only the generator in the pre-trained generative adversarial network can be used.

In some embodiments, step 120 includes step 1201 and step 1202. Step 1201: Input the target image into a first generator of the generative adversarial network, to acquire a shadow image corresponding to the target image. Step 1202: Acquire the image after shadow removal based on the shadow image and the target image.

In the embodiments of this application, after the training of the first to-be-trained generator is completed, the first generator is acquired. When the training of the first to-be-trained discriminator is completed, the first discriminator is acquired. The function of the first generator is to generate a corresponding shadow image according to the inputted target image including a shadow.

In some embodiments, to improve the efficiency of shadow removal, the generative adversarial network only includes the first generator and the first discriminator, and then step 1202 includes: removing the shadow image from the target image to acquire the image after shadow removal.

In the embodiments of this application, if only the first generator and the first discriminator are included in the generative adversarial network, the time for training the generative adversarial network can be saved. Therefore, the generation efficiency of the generative adversarial network can be improved, and the efficiency of removing the shadow from the target image can be improved.

In some other embodiments, to improve the accuracy of shadow removal in the image, the trained generative adversarial network further includes a second generator and a second discriminator. In the embodiments of this application, after the training of the second to-be-trained generator is completed, the second generator is acquired. When the training of the second to-be-trained discriminator is completed, the second discriminator is acquired. The function of the second generator is to generate a shadow-free image according to the target fused image acquired by fusing the inputted target image and the shadow image. Accordingly, step 1202 includes: performing channel fusion on the shadow image and the target image to acquire a target fused image; and inputting the target fused image into the second generator to acquire the image after shadow removal.

Figure 10:
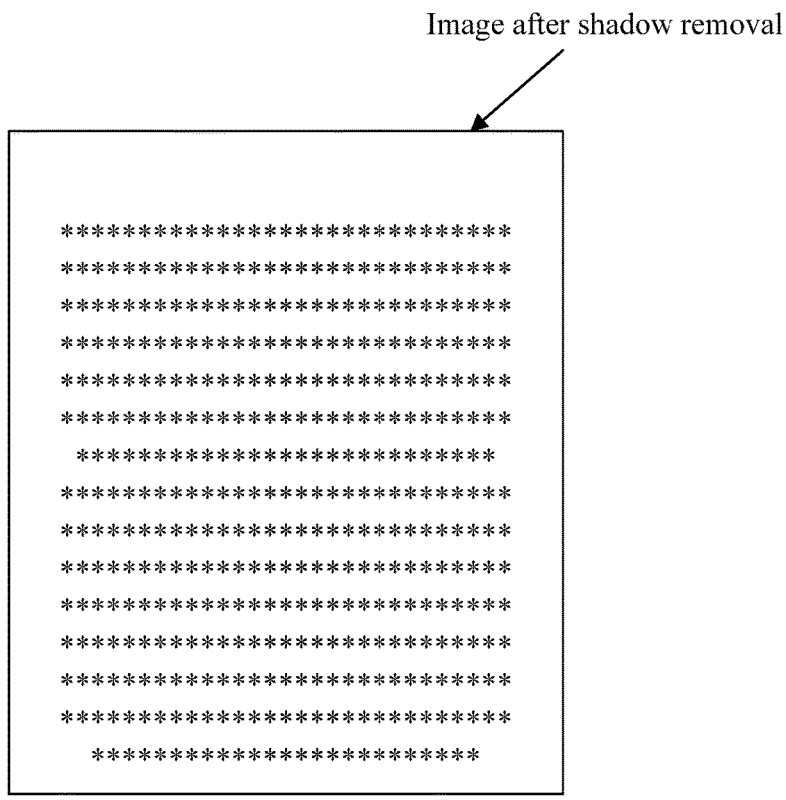
FIG. 10 is a schematic diagram of an image acquired after removing the shadow in FIG. 2 provided by an embodiment of this application.

FIG. 10 is a schematic diagram of an image acquired after removing the shadow in FIG. 2 provided by an embodiment of this application. FIG. 10 shows a shadow-free image of a document.

In embodiments of this application, by inputting the target fused image into the second generator, the shadow-free image can be acquired by deep learning with higher accuracy.

In the embodiments of this application, the training samples are acquired by using the 3D rendering engine, and then the training samples are used to train the generative adversarial network, so as to remove shadows in images and solve the problem of constantly adjusting the posture when shooting some images.

In the embodiments of this application, various real environments in reality can be emulated based on a three-dimensional rendering engine, and the generated data is extensive. At the same time, various imaging parameters in the 3D rendering engine, that is, emulated imaging conditions, can be freely adjusted, so that the generated training sample data is diverse. Moreover, by adding the captured shadow-free real image samples into the 3D rendering engine, the authenticity and reliability of the generated training sample data can be improved, and the rendering time and modeling difficulty can be reduced. Further, the training efficiency of the network can be improved by combining the 3D rendering engine with the training of the generative adversarial network, so as to quickly remove shadow in the image and make the whole image clearer and neater.

The image processing method provided by the embodiments of this application may be performed by an image processing apparatus or a control module included in the image processing apparatus and configured to execute the image processing method. In an embodiment of this application, the information sending method provided in the embodiments of this application is described by using an example in which the information sending method is performed by an information sending apparatus.

Figure 11:
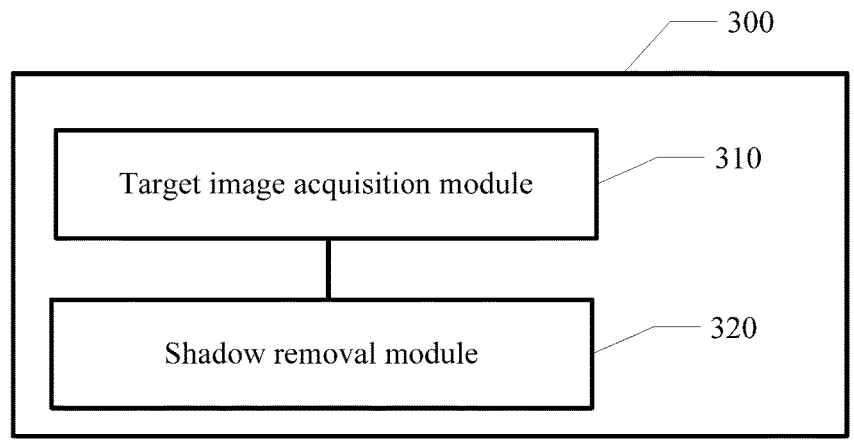
FIG. 11 is a schematic structural diagram of an image processing apparatus provided by an embodiment of this application.

FIG. 11 is a schematic structural diagram of an image processing apparatus provided by an embodiment of this application. As shown in FIG. 11, the image processing apparatus 300 includes:
 a target image acquisition module 310 configured to acquire a target image including a shadow; and
 a shadow removal module 320 configured to remove the shadow from the target image based on a target model, to acquire an image after shadow removal.

The target model is a model trained based on a target image sample including shadows and a shadow image sample corresponding to the target image sample.

The target image sample is a sample generated based on a captured shadow-free image sample and a preset emulated imaging condition, and the shadow image sample is a sample determined based on the target image sample and the shadow-free image sample.

In the embodiments of this application, various real environments in reality can be emulated based on the preset emulated imaging condition, while the actually captured shadow-free image sample is real image data. Therefore, the target image sample is generated based on the actually captured shadow-free image sample and the preset emulated imaging condition, so that the real data and the emulated imaging condition can be combined, to quickly acquire the highly real target image sample and the shadow image sample corresponding to the target image sample that are used to train the target model for removing image shadows, thereby improving the training accuracy and speed of the target model. Since the trained target model is trained based on the target image sample including a shadow and the shadow image sample corresponding to the target image sample, the shadow in the target image can be removed based on the trained target model. Because the training speed and accuracy of the target model are improved, the shadow in the target image can be quickly and accurately removed.

In some embodiments, the target model includes a generative adversarial network.

In some embodiments, the shadow removal module 320 includes:
 a shadow image determination unit configured to input the target image into a first generator of the generative adversarial network, to acquire a shadow image corresponding to the target image; and
 a shadow removing unit configured to acquire the image after shadow removal based on the shadow image and the target image.

In some embodiments, in order to improve the accuracy of shadow removal in the image, the generative adversarial network further includes a second generator.
 the shadow removing unit is configured to:
 perform channel fusion on the shadow image and the target image to acquire a target fused image; and
 input the target fused image into the second generator to acquire the image after shadow removal.

In some embodiments, in order to improve the efficiency of shadow removal in the image, the shadow removal unit is configured to:
 remove the shadow image from the target image to acquire the image after shadow removal.

The image processing apparatus in this embodiment of this application may be an apparatus, or a component, an integrated circuit, or a chip in an apparatus. The apparatus may be a mobile electronic device or a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage NAS), a personal computer (PC), a television (TV), an automated teller machine, or a self-service machine. This is not specifically limited in the embodiments of this application.

The image processing apparatus in this embodiment of this application may be an apparatus with an operating system. The operating system may be an Android (Android) operating system, or may be an IOS operating system or other possible operating systems, which is not specifically limited in the embodiments of this application.

The image processing apparatus provided in this embodiment of this application can implement the processes in the foregoing method embodiment in FIG. 1. To avoid repetition, details are not described herein again.

Optionally, the embodiments of this application further provide an electronic device, including a processor, a memory, and programs or instructions stored in the memory and executable on the processor. When the programs or instructions are executed by the processor, the processes of the foregoing embodiment of the image processing method are implemented, and a same technical effect can be achieved. To avoid repetition, details are not described herein again.

It should be noted that the electronic device in this embodiment of this application includes the above mobile electronic device and non-mobile electronic device.

Figure 12:
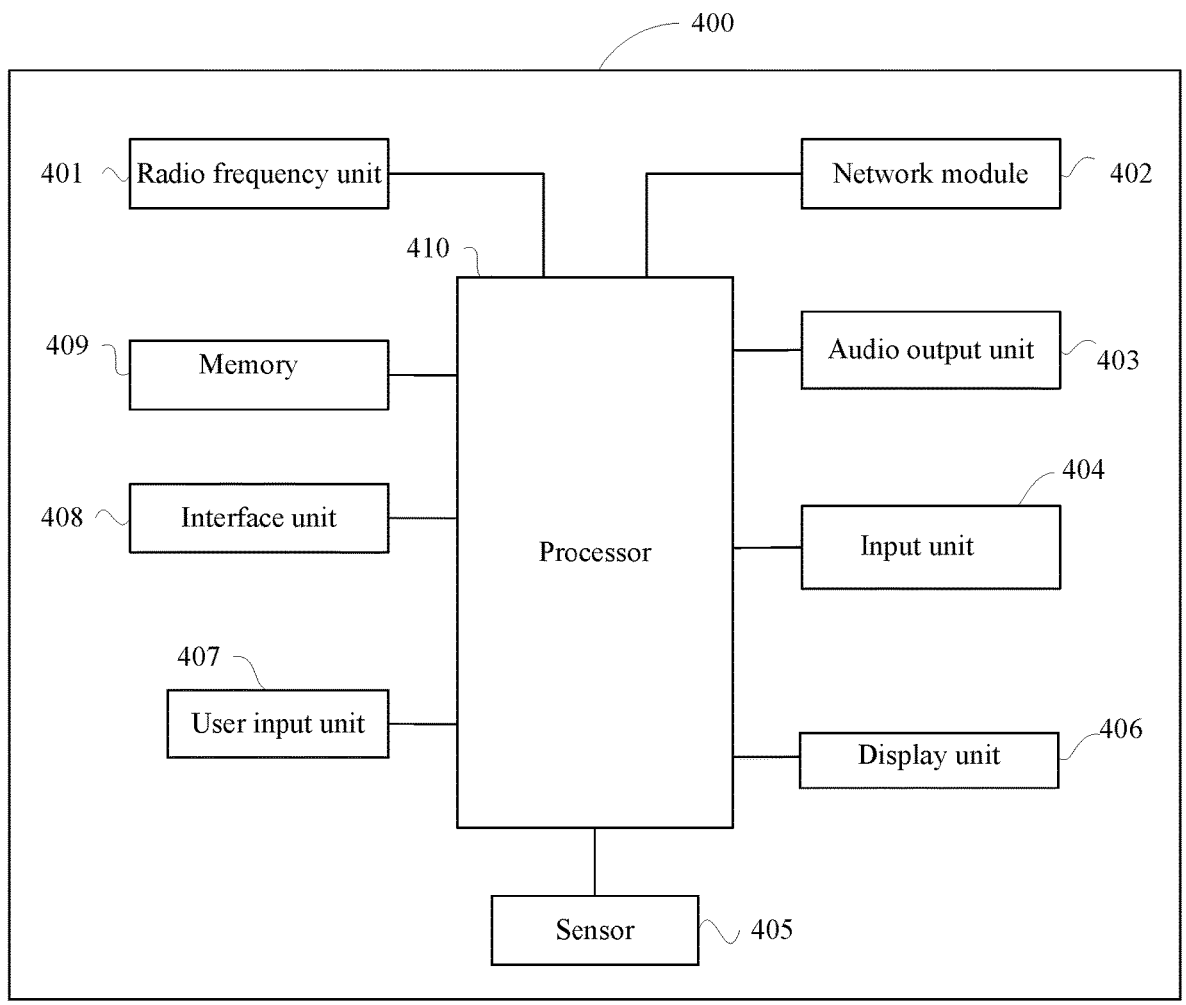
FIG. 12 is a schematic structural diagram of an electronic device provided by an embodiment of this application.

FIG. 12 is a schematic structural diagram of an electronic device according to an embodiment of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the electronic device 400 may further include a power supply (for example, a battery) that supplies power to the components. The power supply may be logically connected to the processor 410 by using a power management system, so as to implement functions such as charging management, discharging management, and power consumption management by using the power management system. The electronic device is not limited to the electronic device structure shown in FIG. 12. The electronic device may include more or fewer components than those shown in the figure, or combine some of the components, or arrange the components differently. Details are not described herein.

The processor 410 is configured to: acquire a target image including a shadow; and remove the shadow from the target image based on a target model, to acquire an image after shadow removal, wherein the target model is a model trained based on a target image sample including a shadow and a shadow image sample corresponding to the target image sample, the target image sample is a sample generated based on a captured shadow-free image sample and a preset emulated imaging condition, and the shadow image sample is a sample determined based on the target image sample and the shadow-free image sample.

In the embodiments of this application, various real environments in reality can be emulated based on the preset emulated imaging condition, while the actually captured shadow-free image sample is real image data. Therefore, the target image sample is generated based on the actually captured shadow-free image sample and the preset emulated imaging condition, so that the real data and the emulated imaging condition can be combined, to quickly acquire the highly real target image sample and the shadow image sample corresponding to the target image sample that are used to train the target model for removing image shadows, thereby improving the training accuracy and speed of the target model. Since the trained target model is trained based on the target image sample including a shadow and the shadow image sample corresponding to the target image sample, the shadow in the target image can be removed based on the trained target model. Because the training speed and accuracy of the target model are improved, the shadow in the target image can be quickly and accurately removed.

The processor 410 is further configured to input the target image into a first generator of the generative adversarial network, to acquire a shadow image corresponding to the target image; and acquire the image after shadow removal based on the shadow image and the target image.

In the embodiments of this application, the shadow in the target image can be removed by acquiring the shadow image corresponding to the target image.

Optionally, the generative adversarial network further includes a second generator, and the processor 410 is further configured to: perform channel fusion on the shadow image and the target image to acquire a target fused image; and input the target fused image into the second generator to acquire the image after shadow removal.

In some embodiments of this application, if only the first generator and the first discriminator are included in the generative adversarial network, the time for training the generative adversarial network can be saved. Therefore, the generation efficiency of the generative adversarial network can be improved, and the efficiency of removing the shadow from the target image can be improved.

In some embodiments of this application, by inputting the target fused image into the second generator, the shadow-free image can be acquired by deep learning with higher accuracy.

Optionally, the processor 410 is further configured to remove the shadow image from the target image to acquire the image after shadow removal.

In the embodiments of this application, if only the first generator and the first discriminator are included in the generative adversarial network, the time for training the generative adversarial network can be saved. Therefore, the generation efficiency of the generative adversarial network can be improved, and the efficiency of removing the shadow from the target image can be improved.

An embodiment of this application further provides a computer-readable storage medium. The computer-readable storage medium stores a program or an instruction. When the program or instruction is executed by a processor, the processes of the foregoing embodiment of the image processing method are implemented, and a same technical effect can be achieved. To avoid repetition, details are not described herein again.

The processor is the processor in the electronic device described in the above embodiment. An example of the computer-readable storage medium includes a non-transitory computer-readable storage medium, such as a computer read-only memory (Read-only Memory, ROM), a random access memory (Random Access Memory, RAM), a magnetic disk, or an optical disc.

An embodiment of the invention also provides an electronic device, configured to perform each process of the foregoing embodiment of the image processing method, and can achieve the same technical effect. To avoid repetition, details are not repeated herein.

An embodiment of this application further provides a chip, where the chip includes a processor and a communication interface, the communication interface is coupled to the processor, and the processor is configured to run a program or an instruction to implement the foregoing processes of the embodiment of the image processing method, and a same technical effect can be achieved. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. An image processing method, comprising:
acquiring a target image including a shadow; and
removing the shadow from the target image based on a target model, to acquire an image after shadow removal,
wherein the target model is a model trained based on a target image sample including a shadow and a shadow image sample corresponding to the target image sample,
wherein the target image sample is a sample generated in a three-dimensional rendering engine based on a captured shadow-free image sample and a preset emulated imaging condition, and the shadow image sample is a sample determined based on the target image sample and the shadow-free image sample and the preset emulated imaging condition comprises an imaging device, a preset obstruction, a preset emulated light source, a preset atmospheric environment, and an imaging plane;
wherein the target image sample is generated by creating a basic environment in the three-dimensional rendering engine, adding the imaging device, the preset obstruction, the preset emulated light source, the preset atmospheric environment, and the imaging plane, adding the shadow-free image sample into the imaging plane, randomly modifying influencing factors of the imaging device, imaging degree of the preset obstruction, parameters of the preset emulated light source, parameters of the preset atmospheric environment and influencing factors of the imaging plane, starting a renderer for rendering.

2. The method according to claim 1, wherein the target model comprises a generative adversarial network.

3. The method according to claim 2, wherein the removing the shadow from the target image based on a target model, to acquire an image after shadow removal comprises:
inputting the target image into a first generator of the generative adversarial network, to acquire a shadow image corresponding to the target image; and
acquiring the image after shadow removal based on the shadow image and the target image.

4. The method according to claim 3, wherein the generative adversarial network further comprises a second generator; and the acquiring the image after shadow removal based on the shadow image and the target image comprises:
performing channel fusion on the shadow image and the target image to acquire a target fused image; and
inputting the target fused image into the second generator to acquire the image after shadow removal.

5. The method according to claim 3, wherein the acquiring the image after shadow removal based on the shadow image and the target image comprises:
removing the shadow image from the target image to acquire the image after shadow removal.

6. An electronic device, comprising:
a processor; and
a memory storing a computer program that is executable on the processor, wherein the computer program, when executed by the processor, causes the electronic device to perform the following steps:
acquiring a target image including a shadow; and
removing the shadow from the target image based on a target model, to acquire an image after shadow removal,
wherein the target model is a model trained based on a target image sample including a shadow and a shadow image sample corresponding to the target image sample,
wherein the target image sample is a sample generated in a three-dimensional rendering engine based on a captured shadow-free image sample and a preset emulated imaging condition, and the shadow image sample is a sample determined based on the target image sample and the shadow-free image sample and the preset emulated imaging condition comprises an imaging device, a preset obstruction, a preset emulated light source, a preset atmospheric environment, and an imaging plane;
wherein the target image sample is generated by creating a basic environment in the three-dimensional rendering engine, adding the imaging device, the preset obstruction, the preset emulated light source, the preset atmospheric environment, and the imaging plane, adding the shadow-free image sample into the imaging plane, randomly modifying influencing factors of the imaging device, imaging degree of the preset obstruction, parameters of the preset emulated light source, parameters of the preset atmospheric environment and influencing factors of the imaging plane, starting a renderer for rendering.

7. The electronic device according to claim 6, wherein the target model comprises a generative adversarial network.

8. The electronic device according to claim 7, wherein the removing the shadow from the target image based on a target model, to acquire an image after shadow removal comprises:
inputting the target image into a first generator of the generative adversarial network, to acquire a shadow image corresponding to the target image; and acquiring the image after shadow removal based on the shadow image and the target image.

9. The electronic device according to claim 8, wherein the generative adversarial network further comprises a second generator; and the acquiring the image after shadow removal based on the shadow image and the target image comprises:
performing channel fusion on the shadow image and the target image to acquire a target fused image; and
inputting the target fused image into the second generator to acquire the image after shadow removal.

10. The electronic device according to claim 8, wherein the acquiring the image after shadow removal based on the shadow image and the target image comprises:
removing the shadow image from the target image to acquire the image after shadow removal.

11. A non-transitory computer-readable storage medium storing a computer program, wherein the computer program, when executed by a processor, performs the following steps:
acquiring a target image including a shadow; and
removing the shadow from the target image based on a target model, to acquire an image after shadow removal, wherein the target model is a model trained based on a target image sample including a shadow and a shadow image sample corresponding to the target image sample,
wherein the target image sample is a sample generated in a three-dimensional rendering engine based on a captured shadow-free image sample and a preset emulated imaging condition, and the shadow image sample is a sample determined based on the target image sample and the shadow-free image sample and the preset emulated imaging condition comprises an imaging device, a preset obstruction, a preset emulated light source, a preset atmospheric environment, and an imaging plane;
wherein the target image sample is generated by creating a basic environment in the three-dimensional rendering engine, adding the imaging device, the preset obstruction, the preset emulated light source, the preset atmospheric environment, and the imaging plane, adding the shadow-free image sample into the imaging plane, randomly modifying influencing factors of the imaging device, imaging degree of the preset obstruction, parameters of the preset emulated light source, parameters of the preset atmospheric environment and influencing factors of the imaging plane, starting a renderer for rendering.

12. The non-transitory computer-readable storage medium according to claim 11, wherein the target model comprises a generative adversarial network.

13. The non-transitory computer-readable storage medium according to claim 12, wherein the removing the shadow from the target image based on a target model, to acquire an image after shadow removal comprises:
inputting the target image into a first generator of the generative adversarial network, to acquire a shadow image corresponding to the target image; and
acquiring the image after shadow removal based on the shadow image and the target image.

14. The non-transitory computer-readable storage medium according to claim 13, wherein the generative adversarial network further comprises a second generator; and the acquiring the image after shadow removal based on the shadow image and the target image comprises:
performing channel fusion on the shadow image and the target image to acquire a target fused image; and
inputting the target fused image into the second generator to acquire the image after shadow removal.

15. The non-transitory computer-readable storage medium according to claim 13, wherein the acquiring the image after shadow removal based on the shadow image and the target image comprises:
removing the shadow image from the target image to acquire the image after shadow removal.

\* \* \* \* \*